(12) United States Patent
Ansari et al.

(10) Patent No.: US 10,896,119 B1
(45) Date of Patent: Jan. 19, 2021

(54) COMMON INPUT/OUTPUT INTERFACE FOR APPLICATION AND DEBUG CIRCUITRY

(71) Applicant: Xilinx, Inc., San Jose, CA (US)

(72) Inventors: Ahmad R. Ansari, San Jose, CA (US); Felix Burton, Foster City, CA (US); Henry C. Yu, Los Altos, CA (US)

(73) Assignee: Xilinx, Inc., San Jose, CA (US)

( * ) Notice: Subject to any disclaimer, the term of this patent is extended or adjusted under 35 U.S.C. 154(b) by 184 days.

(21) Appl. No.: 16/180,811

(22) Filed: Nov. 5, 2018

(51) Int. Cl.
*G06F 11/00* (2006.01)
*G06F 11/36* (2006.01)
*G06F 13/16* (2006.01)
*G06F 13/40* (2006.01)
*G06F 13/28* (2006.01)
*G06F 5/06* (2006.01)

(52) U.S. Cl.
CPC ........ *G06F 11/3656* (2013.01); *G06F 11/364* (2013.01); *G06F 13/1673* (2013.01); *G06F 13/28* (2013.01); *G06F 13/4022* (2013.01); *G06F 13/4027* (2013.01); *G06F 5/06* (2013.01)

(58) Field of Classification Search
CPC ............. G06F 11/3636; G06F 11/3656; G06F 11/364; G06F 13/4022; G06F 13/4027; G06F 13/28; G06F 13/1673; G06F 5/06; G06F 11/2205; G06F 11/2236; G06F 11/267
See application file for complete search history.

(56) References Cited

U.S. PATENT DOCUMENTS

| 8,713,370 B2* | 4/2014 | Millet | G06F 11/3636 714/27 |
| 9,632,895 B2* | 4/2017 | Menon | G06F 11/27 |
| 9,916,273 B2* | 3/2018 | Robinson | G06F 13/4022 |

OTHER PUBLICATIONS

ARM Limited, "CoreSight Technical Introduction," ARM-EPM-039795, Aug. 2013, pp. 1-16, ARM Limited, Cambridge, United Kingdom.
Xilinx, "Zynq UltraScale+ MPSoC," UG1085 v1.5, Mar. 31, 2017, pp. 1-40, Xilinx, Inc., San Jose, California, USA.
Specification and drawings for U.S. Appl. No. 15/944,137, filed Apr. 3, 2018, Ansari et al.

* cited by examiner

*Primary Examiner* — Marc Duncan
(74) *Attorney, Agent, or Firm* — Crawford Maunu PLLC

(57) ABSTRACT

An input-output circuit is coupled to a plurality of serial communication paths and to a physical point-to-point interface. The input-output circuit is configured to transmit data received on the plurality of serial communication paths over the physical point-to-point interface. An application circuit is coupled to the input-output circuit and is configured to communicate via a first one of the paths in performing application functions. A bridge circuit is coupled to the input-output circuit and is configured to communicate via a second one of the paths. A debug circuit is coupled to the application circuit and to the bridge circuit. The debug circuit is configured to capture debug data of the application circuit and provide the debug data to the bridge circuit for communication via the second one of the paths.

20 Claims, 9 Drawing Sheets

COMMON INPUT/OUTPUT INTERFACE FOR APPLICATION AND DEBUG CIRCUITRY

TECHNICAL FIELD

The disclosure generally relates to circuitry for gathering debug data from an application circuit.

BACKGROUND

Many integrated circuits employ scan circuitry to aid in verifying and testing circuit operations. An example of scan circuitry is the Standard Test Access Port and Boundary-Scan Architecture, which was developed by the Joint Test Action Group (JTAG) and formalized in IEEE Standard 1149, Scan test circuitry can be employed in System-on-Chip devices (SoCs).

Complex SoCs can include multiple subsystems, such as a processor subsystem having multiple processor cores, a memory subsystem providing on-chip SRAM and/or DRAM, and a programmable logic subsystem having circuitry such as a field programmable gate array (FPGA). An SoC can also include hardwired logic that can be used to perform certain mathematical functions as directed by software executing on the processor or a circuit implemented in programmable logic of the SoC.

Testing a system implemented on an SoC can involve transfer of a large quantity of data between the SoC and a test controller such as a debugger system that executes on a host computer system. The debugger system can read data from and write data to the storage circuits within the various subsystems of the SoC. In current systems, debug steps are sequenced one-by-one from the debugger system on the host computer. The high latency involved in sequencing debug steps, along with the relatively slow dock rate at which the JTAG interface circuitry operates, for example, less than 100 MHz, can extend the time required for testing.

SUMMARY

A disclosed circuit arrangement includes an input-output circuit coupled to a plurality of serial communication paths and to a physical point-to-point interface. The input-output circuit is configured to transmit data received on the plurality of serial communication paths over the physical point-to-point interface. An application circuit is coupled to the input-output circuit and is configured to communicate via a first one of the paths in performing application functions. A bridge circuit is coupled to the input-output circuit and is configured to communicate via a second one of the paths. A debug circuit is coupled to the application circuit and to the bridge circuit. The debug circuit is configured to capture debug data of the application circuit and provide the debug data to the bridge circuit for communication via the second one of the paths.

A disclosed system-on-chip (SOC) includes an integrated circuit (IC) die and a plurality of circuit subsystems disposed on the IC die. A plurality of input-output circuits are configured to access storage circuits in the plurality of circuit subsystems, and an input-output circuit is coupled to a plurality of serial communication paths and to a physical point-to-point interface. The input-output circuit is configured to transmit data received on the plurality of serial communication paths over the physical point-to-point interface. Application circuitry is implemented on the plurality of subsystems and is coupled to the input-output circuit. The application circuitry communicates via a first one of the communication paths in performing application functions. A bridge circuit is coupled to the input-output circuit and configured to communicate via a second one of the communication paths. A debug circuit is coupled to the application circuit, the bridge circuit, and to the plurality of input-output circuits. The debug circuit captures debug data of the application circuitry and provides the debug data to the bridge circuit for communication via the second one of the communication paths.

A disclosed method includes performing application functions of application circuitry on an integrated circuit (IC). Application data is input to and output from the application circuitry via a first path of a plurality of serial communication paths coupled to an input-output circuit of the integrated circuit. Debug data of the application circuitry is captured by a debug circuit implemented on the IC. The debug data is transmitted from the debug circuit to a bridge circuit and then output from the bridge circuit via a second one of the communication paths to the input-output circuit. The input output circuit outputs the debug data and application data via a single physical point-to-point interface.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figure 1:
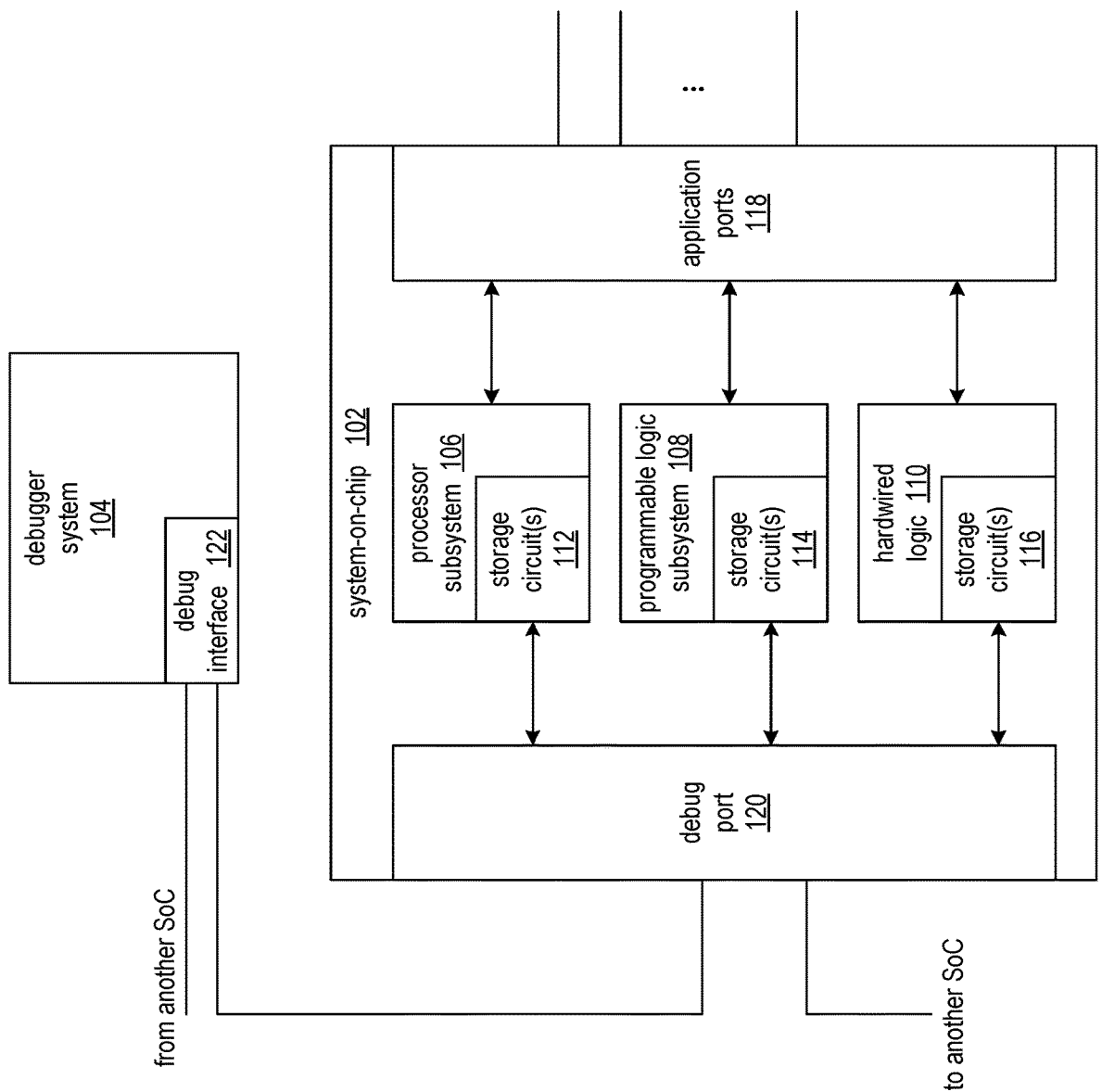
FIG. 1 shows a debugger system and a system-on-chip SoC having subsystems for implementing application software and application circuitry, along with debug circuitry for supporting debugging the application.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods provide improved approaches for gathering trace data from and debugging complex SoCs. As used herein, "SoCs" will be used to refer to systems in packages, including, for example, a system constructed using stacked silicon interposer technology. The approaches provide a unified debugging interface that provides high-speed data transfer via a point-to-point serial communications channel between all subsystems of the SoC and a debugger system connected to the device.

In the exemplary circuit arrangements, an input-output circuit has multiple point-to-point serial communication paths. An application circuit is coupled to the input-output circuit and communicates via a first one of the paths in performing application functions. A bridge circuit is also coupled to the input-output circuit and is configured to communicate via a second one of the paths. A debug circuit is coupled to the application circuit and to the bridge circuit. The debug circuit captures debug data of the application circuit and provides the debug data to the bridge circuit for communication via the second one of the paths.

In some arrangements, an SoC includes a processor subsystem, a programmable logic subsystem, and hardwired logic circuits, examples of which can include math engine circuits that can be implemented as digital signal processors. The application circuit can include one or more of software executing on the processor subsystem, a circuit implemented in the programmable logic subsystem, or one or more of the hardwired logic circuits.

An input-output circuit is disposed on the SoC and has multiple point-to-point serial communication paths. The application circuit is coupled to the input-output circuit and communicates via a first one of the paths in performing application functions. A bridge circuit is also disposed on the SoC and is coupled to the input-output circuit. The bridge circuit communicates off-chip via a second one of the paths. A debug circuit on the SoC is coupled to the application circuit and to the bridge circuit. The debug circuit captures debug data of the application circuit and provides the debug data to the bridge circuit for communication via the second one of the paths. The processor subsystem, a programmable logic subsystem, and hardwired logic circuits can input and output application data off-chip via one or more of the point-to-point serial communication paths in parallel with the debug circuit communicating debug data via another point-to-point serial communication path.

In an exemplary implementation, the point-to-point serial communication channel can be implemented as a PCI Express (PCIe) interface circuit. PCIe devices communicate via links, which are logical connections implemented over serial signal lines. A link provides a point-to-point communications channel between two PCIe devices, and both devices can send and receive over the link. A logical link includes one or more physical paths, and connected devices can use one or more paths depending on the bandwidth requirements. Each path can include two differential signaling pairs. One signaling pair is for receiving data and the other signaling pair is for transmitting data.

Use of the same input-output circuit by the application circuit and the debug circuit allows a debugger system executing on a host data processing system to access debug and trace features of the application circuit without the need for an additional interface for the debug channel. For example, prior approaches for providing a debug channel include an Ethernet or JTAG interface. In addition to providing higher throughput of debug data than conventional debug channels such as JTAG, the disclosed circuits and methods maintain separation between the debug channel and application function channel, thereby providing a non-intrusive debug capability. The debug interface through PCIe also supports debugging the subsystems within a remote programmable device that is connected through PCIe, such as cards within the servers in a data center.

FIG. 1 shows a debugger system and a system-on-chip SoC having subsystems for implementing application software and application circuitry, along with debug circuitry for supporting debugging the application. The SoC 102 has multiple subsystems, including a processor subsystem 106, which can include one or more processor cores, a programmable logic subsystem 108, which includes programmable logic and programmable interconnect circuitry, and hardwired logic circuits 110 that implement mathematical functions, for example. The hardwired logic circuits can also be referred to as "math engines." Although the hardwired logic circuits are sometimes referred to as math engines, the hardwired logic circuits can include any kind of data processing engine (DPE) such as digital signal processing engines, cryptographic engines, Forward Error Correction (FEC) engines, or other specialized hardwired circuits for performing one or more specialized tasks. In an exemplary implementation, the math engines can be interconnected using a plurality of switches for transmitting streaming data between the engines.

Each of the processor subsystem, programmable logic subsystem, and hardwired logic circuitry includes storage circuits 112, 114, and 116, respectively. The storage circuits can include memories, such as SRAM or DRAM, and/or configuration and control registers. The storage circuits 112, 114, and 116 can be accessed by an application implemented as software executing on the processor subsystem 106, by a circuit implemented in programmable logic subsystem 108, and/or by hardwired logic circuit 110.

The application executing as software on the processor subsystem and/or operating as a circuit on the programmable logic subsystem and/or operating as a circuit in the hardwired logic, inputs data from and outputs data to systems outside the SoC via the application ports 118. The application ports can include gigabit transceivers and various standards-based or proprietary bus interfaces, for example.

The SoC 102 further includes a debug port 120 that is dedicated to providing access to the storage circuits 112, 114, and 116 for the debugger system 104. The debugger system 104 can perform debugging and trace functions while the SoC is executing an application. In addition, through the debug port, the debugger system can configure the SoC with software to be executed on the processor subsystem 106 and/or configure the programmable logic subsystem 108 to implement application circuitry. The debug interface 122 on the debugger system is connected to the debug port 120. In an exemplary implementation, the debug port and debug interface can communicate using the Aurora 64B/66B interface on gigabit transceivers operated in dual simplex mode to support daisy chaining and parallel debugging of multiple SoCs.

Figure 2:
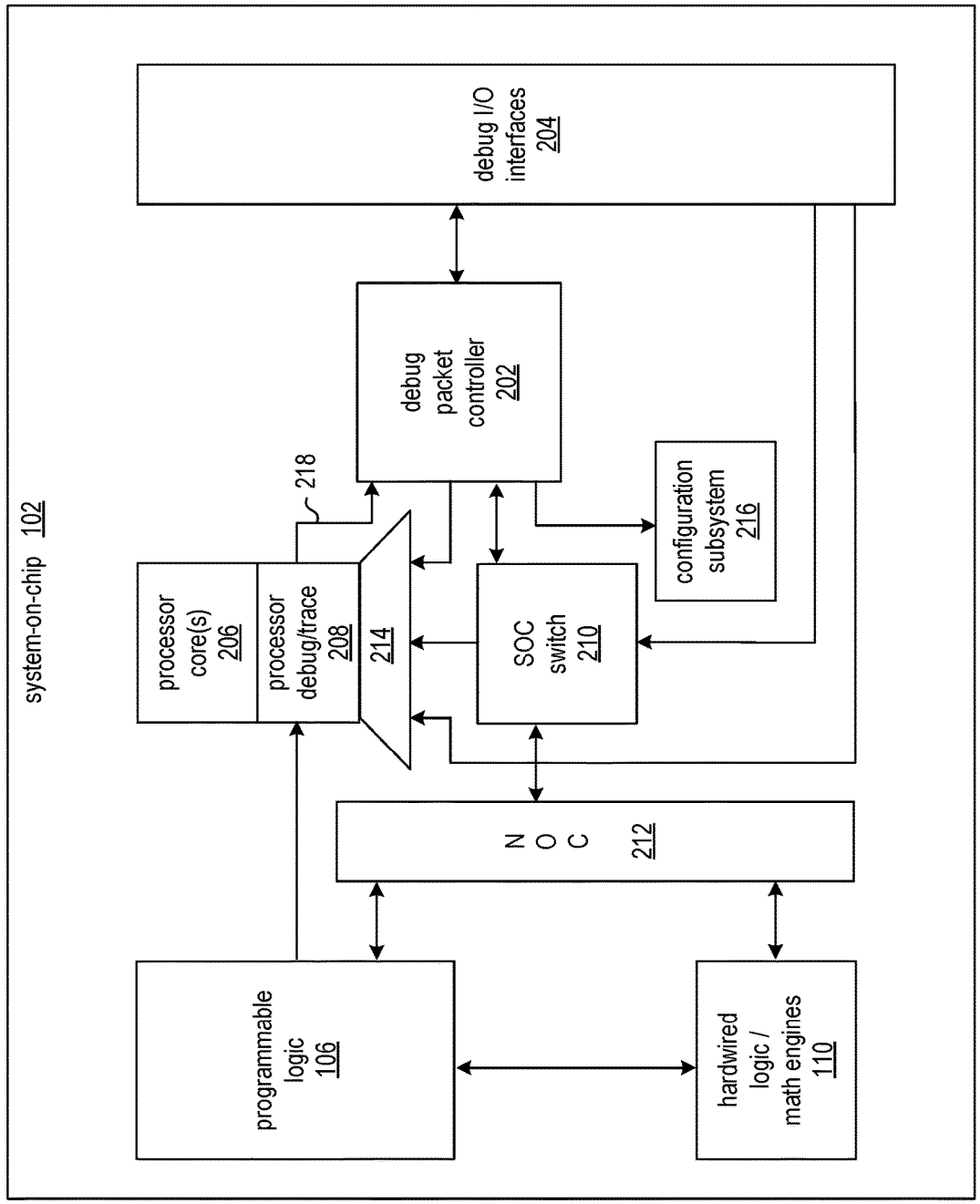
FIG. 2 shows an SoC and exemplary interfaces between subsystems of the SoC and circuitry of the debug port.

The debug port 120 includes a debug packet controller (FIG. 2, #202). The debug packet controller implements a pull model in order to retrieve data from various subsystems on the SoC 102. The flow of transactions within the SoC is from the debug packet controller to the referenced resources. Having the debug packet controller initiate the flow of transactions simplifies the design for handling trace data and passing the flow control back to the host in the debug environment. In order to support a trace mode in which trace data is pushed out of the SoC by the debug port, an output buffer (not shown) on the SoC stores the trace data in order to allow debug port to pull the data using consecutive bursts and emulate an outbound trace stream. The trace buffer can be implemented in the programmable logic subsystem 108, DRAM, on-chip memory of the processor subsystem 106, or funneled into a CoreSight trace buffer when a unified trace stream across multiple trace sources is desired.

The debug port 120 can be configured to support two modes of operation. In one mode, which can be referred to as "Normal Debug Mode," both inbound and outbound ports are used together as the debug and trace interface. Each debug operation is initiated by the debugger system 104 and can be executed through the debug port 120. In the second mode, which can be referred to as "Trace Mode," the debugger system issues one set of debug packets, and thereafter the debug port generates read requests repeatedly from the set of debug packets in order to provide an outbound trace stream. The Trace Mode can be activated by way of the "Perpetual" operation code in a debug packet.

The debug port 120 receives debug packets from the debugger system 104. If the Aurora interface is used as the link layer interface, each debug packet can be embedded in the user protocol data unit (PDU) section of an Aurora packet, and the debug packet includes a header, an optional payload, and a CRC field. The header of the debug packet includes a Reserved field for future expansion, a Target_ID Field, a Packet Sequence Number field and a Command Opcode field. The debug packet can also include optional Payload field and a cyclic redundancy check (CRC) code.

The Target_ID field is used to identify the target SoC in a configuration that involves daisy chained SoCs in implementations not involving PCIe for application and debugging communications. During Enumeration, each SoC passes its own Target_ID to the next SoC in the daisy chain, and the next SoC will increment the value of the Target_ID and use the incremented value as its Target_ID. The Target_ID equal to zero is reserved for the host debugger system and is typically the Target_ID that is passed to the first device in the chain from the host debugger system during enumeration. Otherwise, the hosts passes the Target_ID of the target SoC to the first SoC in the daisy chain. For every debug packet that is sent to a target SoC, a response having the same Target_ID is expected to be sent back to the debugger system.

The Sequence Number field specifies an integer that is used to track debug packets that are sent to a target SoC. Similar to the Target_ID, for every packet that is sent to a target SoC, a response having the same packet Sequence Number is expected by the debugger system. Debug packets having Reset and Get_Sequence operations codes do not require responses having the same Sequence number. If a packet is received out of sequence at an SoC and the packet is not resident in the debug port 120 of the SoC, that packet is dropped and no response is generated. If a response packet is not received by the debugger system or if there is an error in the transmission of the response, the debugger system can resend the same request packet with the same Target_ID and packet Sequence Number. In that case, the debug port will resend the response packet, if the response is still resident in the debug port.

The CRC field can be the last field of every debug packet. When the CRC of an ingress packet is invalid, the packet is dropped by the debug port. The Opcode field specifies the packet type or is used to identify the main actions that is performed by the packet. The value in the Opcode field can be referred to as an "operation code." When a packet is handled successfully by debug packet controller, the Opcode field in the response packet, which will have the same Sequence Number as in the debug command packet, will indicate an OK status for all queued packets and indicate a Special_OK status for non-queued packets. Examples of non-queued debug packets are those having Reset and Get_Sequence operation codes. On the other hand, a debug packet that is not handled by any target SoC will be received by the debugger system with the Opcode field unmodified.

Exemplary operation codes in the main Opcode field include Enumerate, Reset, Get_Sequence, and Memory. In a debug packet having a Memory operation code, one or more specific access operations can be specified as explained further below. The additional specific access operations of a Memory code can also be referred to as "subcommands." The operation code in the main Opcode field and the memory subcommands can all be referred to generally as operation codes.

The Enumerate operation can be used to assign target identifiers to be referenced by Target_IDs to the SoCs in a chain. Upon receipt of a debug packet having an Enumerate operation code, the receiving SoC increments the value of Target_ID in the ingress packet and assigns the incremented value as its own Target_ID. The debug packet controller can store the incremented Target_ID value in a local register (not shown). Next, the debug packet controller will send the debug packet having the incremented Target_ID to the next SoC. The process is repeated until the debug packet with the Target_ID of the last device is received by the debugger system. If the Target_ID is 255, the packet will be forwarded as is and without any action being taken. The debug packet controller on each SoC expects the Sequence number in the next debug packet received to be the Sequence number of the Enumerate debug packet plus 1. When an Enumerate packet is received, the debug port should be in the reset state and not processing any other debug packets. If not, the debug port on every target device must be reset before an Enumerate packet is sent by the host debugger system. When the Enumerate packet is received, it is possible that the debug port was already in the middle of processing packets. Therefore, an Enumerate packet command also serves as the reset of the debug port for all the SoCs within the system, and upon receipt of the Enumerate packet, the packet that is being streamed out will be terminated, the packet buffer pointers are reset.

The Reset operation can be used to reset all pending operations in a target SoC. Upon receipt of a Reset packet, if any packet is being streamed out, the packet will be terminated and no Response will be generated for all the pending packets that were terminated. Additionally, the packet buffer pointers are reset. The response packet uses the Special_Okay code to signal to the host debugger system to not mistake the response packet for a previously queued packet with the same Sequence Number whose response was already queued up and is being sent back to the host.

The Get_Sequence operation can be used to provide the expected Sequence Number for the next debug packet on an SoC identified by the Target_ID value. The Sequence Number field of the Get_Sequence packet is 0 and is ignored by debug port. The next sequence number is passed in the Sequence Number field of the response packet. The response packet for the Get_Sequence packet also uses a Special_Okay code to indicate to the host debugger system to not mistake this packet with another packet that was already queued up.

A debug packet having a Memory operation code can have multiple subcommands that access referenced memory addresses. The debug packet controller decodes the subcommands, determines the interface circuit to which an access request should be issued, and issues the access request. The addresses in the debug packet can reference the storage circuits 112 of the processor subsystem 106, storage circuits 114 of the programmable logic subsystem 108, or storage circuits 116 of the hardwired logic circuitry 110.

A Memory command packet can include one or more data transfer operations that are specified in the Payload section of the packet and are executed by the debug packet controller. All debug and trace data is transferred from the target SoC to the host debugger system in response to Memory debug packets that are generated by the host debugger system. The memory operations that are specified in the Payload section of the packet can be single, burst, or stream (FIFO) transactions to any address within the address space of the SoC 102. All memory operations included in a memory access debug packet collectively carry a single Sequence Number that is specified in the Header of the packet. The debug packet controller generates one response back to the host debugger system for each Memory debug packet. The Retry operation is carried out at the packet level which corresponds to the collection of memory operations. The Retry operation of a Memory packet does not cause the memory subcommands to be executed on the SoC. A Retry operation causes the debug packet controller to resend the response packet back to the host debugger system if the response packet is present in the outbound buffer. The Opcode in the response packet indicates an OK, or an invalid status if the packet is inconsistent with the implementation.

The different subcommands that can be included in a Memory debug packet include: Read_Mem_Op, Write_Mem_Op, Stream_Mem_Op, Perpetual, TestMem_Mem_Op, TestCond_Mem_Op, GetCond_Mem_Op, SkipIf_Mem_Op. The Read_Mem_Op subcommand can be used to initiate a read operation on the SoC 102. A debug packet having the Read_Mem_Op subcommand specifies a size (e.g., the number of bits in a beat), length (e.g., the number of beats), and an address. The response issued by the debug packet controller to a Read_Mem_Op subcommand can include the data read from the referenced address.

The Write_Mem_Op subcommand can be used to initiate a write operation on the SoC 102. A debug packet having the Write_Mem_Op subcommand specifies a size, length, an address, and data to be written to the address. The debug packet controller does not issue a response to a Write_Mem_Op subcommand.

The Stream_Mem_Op subcommand can be used to read values from a FIFO buffer that has a fixed access address, for example, to read 8 words (or beats) from a fixed address. As the FIFO buffer may not be full, 3 valid words and 5 invalid words might be returned. The debug packet controller would provide the 3 valid words in the response. The Count field in the response indicates the quantity of valid data returned. The Stream_Mem_Op can be included in at least one of the debug packets that are indefinitely executed in the trace mode as described above.

In response to a Perpetual operation code, the debug packet controller repeats the commands in all four buffers indefinitely until a "Reset," "Enumerate," or "Get_Seqence_Number" is issued by the host debugger system. The Perpetual operation code eliminates the need for a memory mapped location to start the trace mode. To use the Perpetual operation code, the user issues a number of debug packets and then issues a debug packet having the Perpetual opcode. In an exemplary current implementation, there are 4 packet buffers and as a result the number of queued packets the debug packet controller operates on in response to a Perpetual operation code is 4, excluding Perpetual packet itself. The debug packet controller then executes operations in the buffered packets. Each response has an incremented Sequence ID.

The debug packet controller provides mechanisms for the storage circuits, such as trace buffers and debug elements, to be accessed based on the conditions of other storage elements within the system. This feature allows multiple trace or debug elements to be accessed concurrently and speculatively in one packet rather than involving the host debugger system in checking the status of these buffers and accessing them only if conditions are favorable (e.g., full or ready). Involving the host debugger system in checking the status would incur considerable turnaround time.

The TestMem_Mem_Op subcommand can be used to set one or more bits in a condition register if a data value, which is referenced by an address in the debug packet, ANDed with a mask value in the debug packet, is equal to a compare value in the debug packet. If the result of the AND is not equal to the compare value, the bit(s) in the condition register are cleared.

TestCond_Mem_Op subcommand can be used to set one or more bits in a condition register if one or more bits of the condition register, which are referenced by a field in the debug packet, ANDed with a mask value in the debug packet, is equal to a compare value in the debug packet. If the result of the AND is not equal to the compare value, the bit(s) in the condition register are cleared.

The SkipIf_Mem_Op subcommand can be used to skip processing of memory subcommands in a debug packet to a location within the command payload represented by a destination field of the SkipIf_Mem_Op subcommand, if bits of the condition register specified in the subcommand are equal to the True field in the subcommand. If the compared values are not equal, next consecutive memory subcommand in the debug packet is processed.

A GetCond_Mem_Op subcommand can be used by the host debugger system to explicitly return the state of the condition register so that the host debugger system can determine whether a SkipIf_Mem_Op caused skipping of subcommand and whether or not the host debugger system should expect a response from a read or write operation that followed the SkipIf_Mem_Op.

FIG. 2 shows an SoC 102 and exemplary interfaces between subsystems of the SoC and circuitry of the debug port 120 (FIG. 1). The circuitry of the debug port generally includes a debug packet controller 202 and a debug I/O interface 204. The debug packet controller 202 is responsible for processing debug packets received from the debugger system 104 (FIG. 1). The debug I/O interface is a high-speed interface on the SoC through which debug packets are passed to the debug packet controller and responses are returned to the debugger system by the debug packet controller. The debug I/O interfaces can include the Aurora interface described above and a JTAG interface.

The debug packet controller 202 receives and stores debug packets received from the debugger system 104 in buffer circuitry. The operation codes in the debug packets are decoded by the debug packet controller, and based on the operation codes the debug packet controller determines destinations and performs high-level flow control and management tasks. The debug packet controller determines the proper interface circuit to which a request should be routed based on the addresses in the debug packets. Requests are issued by the debug packet controller on the proper interface circuit, and responses to the requests are stored in an output data buffer, which can be is accessed by the debug I/O interfaces 204.

The debug packet controller 202 determines if the address in a debug packet references a storage circuit of a processor subsystem 106 on the SoC 102, a storage circuit of a programmable logic subsystem on the SoC, or a storage circuit of a math engine circuit on the SoC. More specifically, the addressed target can be a dedicated debug subsystem/Interconnect in the processor subsystem; the dedicated trace buffer in the processor subsystem; the device configuration subsystem 216 interface for configuring the processor core(s) 206 of the processor subsystem or the programmable logic subsystem 106 before boot; and the SoC switch 210 and network-on-chip (NoC) 212 for accessing all operational registers within the system including registers of the processor subsystem, registers of the circuits implemented in the programmable logic subsystem, and registers in the hardwired logic/math engines 110.

The processor subsystem can include a processor debug/trace circuit 208, which can provide debug access to the storage circuits of the processor subsystem and also buffer and assemble trace data from the processor subsystem and also from the different subsystems on the SoC. An example of the processor debug/trace circuitry 208 is the ARM CoreSight debugger.

The debug packet controller 202 can selectively and directly receive trace data from the processor debug/trace circuit as shown by signal line 218. Alternatively, the debug packet controller can issue read and write requests via the multiplexer circuitry 214 to access the storage circuits of the processor subsystem through the processor debug/trace circuit 208. Access to the storage circuits of the processor subsystem can further be provided to off-SoC circuits via the debug I/O interfaces 204 and to on-SoC components via the SoC switch 210.

The debug packet controller 202 can also interface to the configuration subsystem 216. The configuration subsystem can include circuitry such as a configuration access port that accesses the configuration memory (not shown) of the programmable logic 106. The debug packet controller can issue write requests to the configuration subsystem with data from debug packets to be stored in the configuration memory in order to implement a circuit in the programmable logic 106. The debug packet controller can also issue read requests to read back configuration data from the configuration memory.

Figure 3:
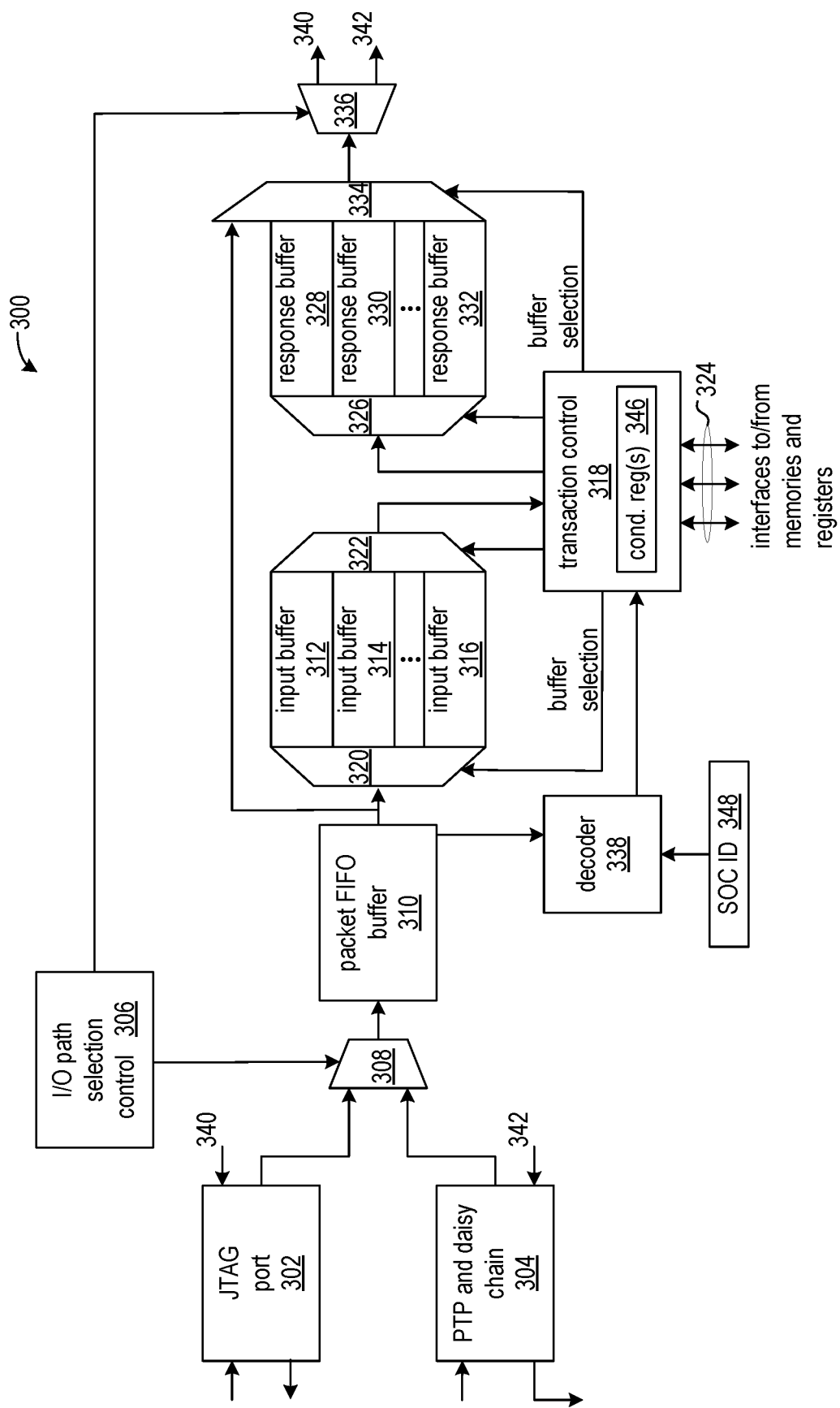
FIG. 3 shows an exemplary implementation of debug circuitry of an SoC.

FIG. 3 shows an exemplary implementation of debug circuitry 300 of an SoC. The debug circuitry 300 includes logic of the debug packet controller 202 and the debug I/O interfaces shown in FIG. 2. The debug packet controller is configurable to select from either a JTAG port 302 or a daisy-chained or a point-to-point (PTP) and daisy chain connection 304. Another port, which is not shown, can be to receive debug packets and send responses to local debugger circuitry such as can be implemented on the programmable logic subsystem. The I/O path selection control 306 can be configurable, such as with a register (not shown), to select the desired input path by multiplexer 308.

The JTAG port can include a JTAG to Advanced Extensible Interface (AXI) Stream bridge (not shown). The bridge can be based on a security gate and de-serializer that allows users to send debug packets to the debug packet controller through a tap in the JTAG chain. The bridge to the debug packet controller provides fast data transfer rates due to a streamlined and low-overhead design. The bridge also allows testing the functionality of the debug packet controller without requiring Aurora based functionality.

The JTAG interface can be useful in trace mode. Ingress (inbound) debug packets can be accessed through JTAG and egress (outbound) response data can be output via the PTP interface. In the trace mode, a limited number of packets are input, e.g., 4 packets in the exemplary implementation, while a very large number of outbound trace packets are generated.

PTP and daisy chain port 304 can be implemented using the Aurora interface from XILINX, Inc. The Aurora interface implements a light-weight link-layer protocol that can be used to move data point-to-point across one or more high-speed serial lanes. The Aurora interface is simple and can be implemented with low overhead, supports daisy chaining of multiple devices with a single cable, and can be potentially used as a raw streaming output interface. The Aurora protocol bridge is responsible for the Physical and Link Layers of the Debug Interface. The Aurora subsection handles the electrical signaling and the clock and symbol coding. If dynamic channel bonding is supported in the IP, Aurora also prepares channels for single- and multi-lane configurations and controls the mapping of data to individual lanes or Data Striping. Aurora allows idle sequences within debug packets and therefore eliminates the need to buffer the entire packets. In an exemplary implementation, the Aurora interface is configured to implement 64*b*/66*b* encoding in simplex mode with 2 separate channels. The Aurora interface is configured to support framing in order to encapsulate debug packets.

The debug packet controller can queue or bypass queuing of a debug packet depending on the Target_ID and main operation code in the debug packet. Queued packets are queued in the debug packet controller input buffers, which in an exemplary implementation provide storage for four debug packets, and are applied to the SoC in order. All debug packets having memory operations and that have a Target_ID that matches the target identifier of the SoC of the receiving debug packet controller, and that are not interpreted as Retry packets are queued and buffered.

Non-Queued debug packets are processed as soon as identified by the debug packet controller and may or may not be stored locally depending on the operation code and the availability of the egress channel. In addition to debug packets having operation codes of Enumerate, Reset, and Get_Sequence, a debug packet having a Target_ID that references another SoC is not queued. The debug packet having a non-matching Target_ID is directly forwarded as long as the outbound channel is not busy transferring the response of a queued packet. Retry debug packets are also not queued. A Retry debug packet is a packet that is sent again by the host debugger system and the response happens to still be present in an output buffer of the debug packet controller. The response to a Retry debug packet will be the next response sent, followed by the transfer of the response to a debug packet that was already scheduled to be sent.

The control and flow of debug packets to an SoC is managed by the host debugger system 104 (FIG. 1). The host debugger system is expected to not send more than 4 Queued debug packets to an SoC until the response to the first Queued debug packet is received. If the host debugger system attempts to send a 5th Queued debug packet before the response to the first debug packet has been transmitted by the debug packet controller, the debug packet will be dropped by the debug packet controller, and no response will be generated for the debug packet. Although, the host debugger system can detect this occurrence and correct execution, the host debugger system is expected to track the packets that have been sent and responded to and not issue excessive requests. The debug packet controller can accept a fifth packet that is a Non-Queued debug packet.

The debug packet controller temporarily stores each input debug packet in the packet first-in-first-out (FIFO) buffer 310. The decoder circuit 338 decodes the header of the packet (first word) at the head of the FIFO buffer in order to determine whether the packet is be queued in one of the input buffers 312, 314, . . . , 316, or is to directly exit the debug packet controller. If the egress port is busy transferring a response or another debug packet, the inbound debug packet will be stored in the FIFO buffer 310 until the output port becomes available.

The decoder circuit 338 performs a first-level decoding of the header of the debug packet for purposes of signaling the transaction control circuit 318 as to whether the packet should bypass the input buffers 312, 314, . . . , 316. For example, if the Target ID specified in the debug packet does not match the SoC ID in register 348, the decoder circuit 338 signals the transaction control circuit 318 that none of the input buffers should be enabled for storage of the debug packet, and the debug packet on the bypass path should be selected by multiplexer 336.

If the Target ID in the debug packet matches the SoC ID (the Target_ID of the device) in the register 348 and the debug packet is not one of the non-queued packet types described above, the decoder circuit 338 signals the transaction control circuit 318 that the debug packet is available to store in one of the input buffers 312, 314, . . . , 316. The transaction control circuit selects an available one of the input buffers, and by way of demultiplexer 320 directs the debug packet for storage in the selected input buffer. If all the input buffers are full, the debug packet is not stored in any of the input buffers and is discarded.

The transaction control circuit 318 by way of multiplexer 322 selects a debug packet for processing. For debug packets having operation codes that specify access to storage circuits, the transaction control circuitry selects one of the interface circuits to the different subsystems of the SoC based on the address in the debug packet. Signal lines 324 connect the different interfaces to the subsystems.

Response packets having data retrieved from the subsystems or data provided by the transaction control circuit 318 are stored in the response buffers 328, 330, . . . , 332. The transaction control circuit uses demultiplexer 326 to direct the response packet to an available one of the response buffers.

As response packets become available in the response buffers, by way of multiplexer 334 the transaction control circuit selects a response packet from one of the response buffers for output. The selected response packet is directed to demultiplexer 336. The outputs 340 and 342 from multiplexer 336 are connected to the inputs of JTAG port 302 and PTP and daisy chain port 304.

The transaction control circuit includes a condition register 346 that can used in tracking the results of the test operations, such as TestMem_Mem_Op and TestCond_Mem_Op. The value(s) in the condition register can also be used to control the flow of processing of operations in a debug packet.

Figure 4:
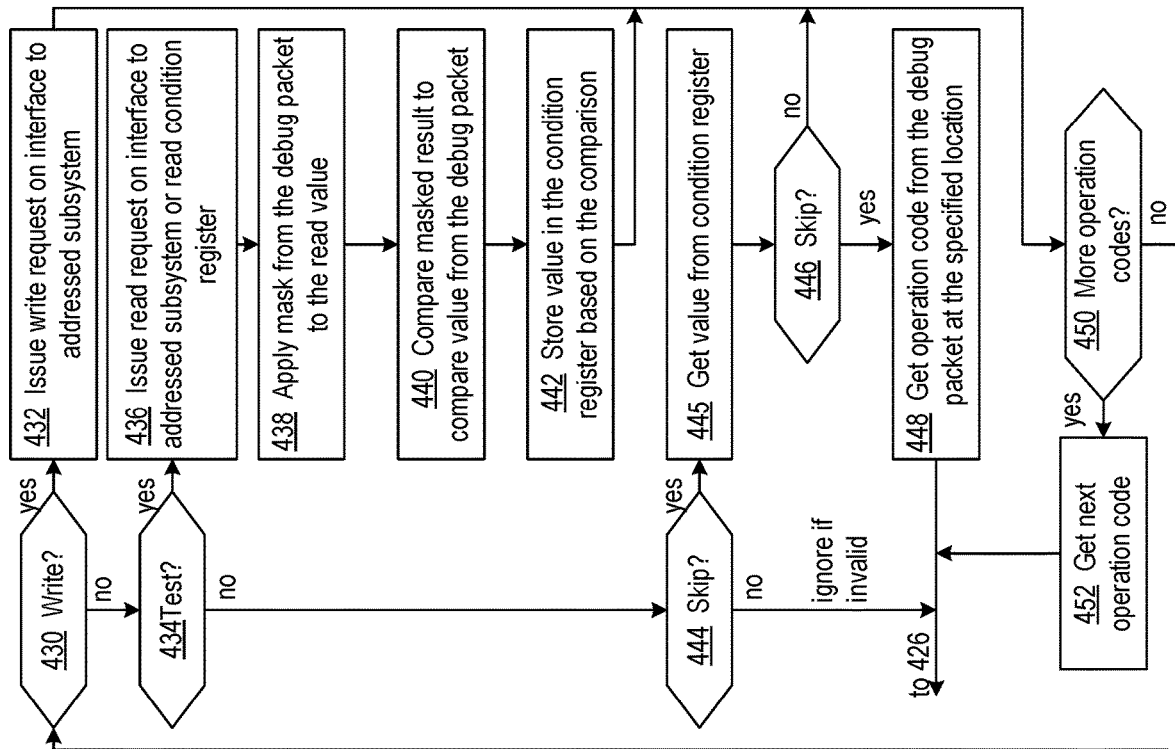
FIG. 4 is a flowchart that illustrates processing of debug packets by the debug packet controller.
Figure 4:
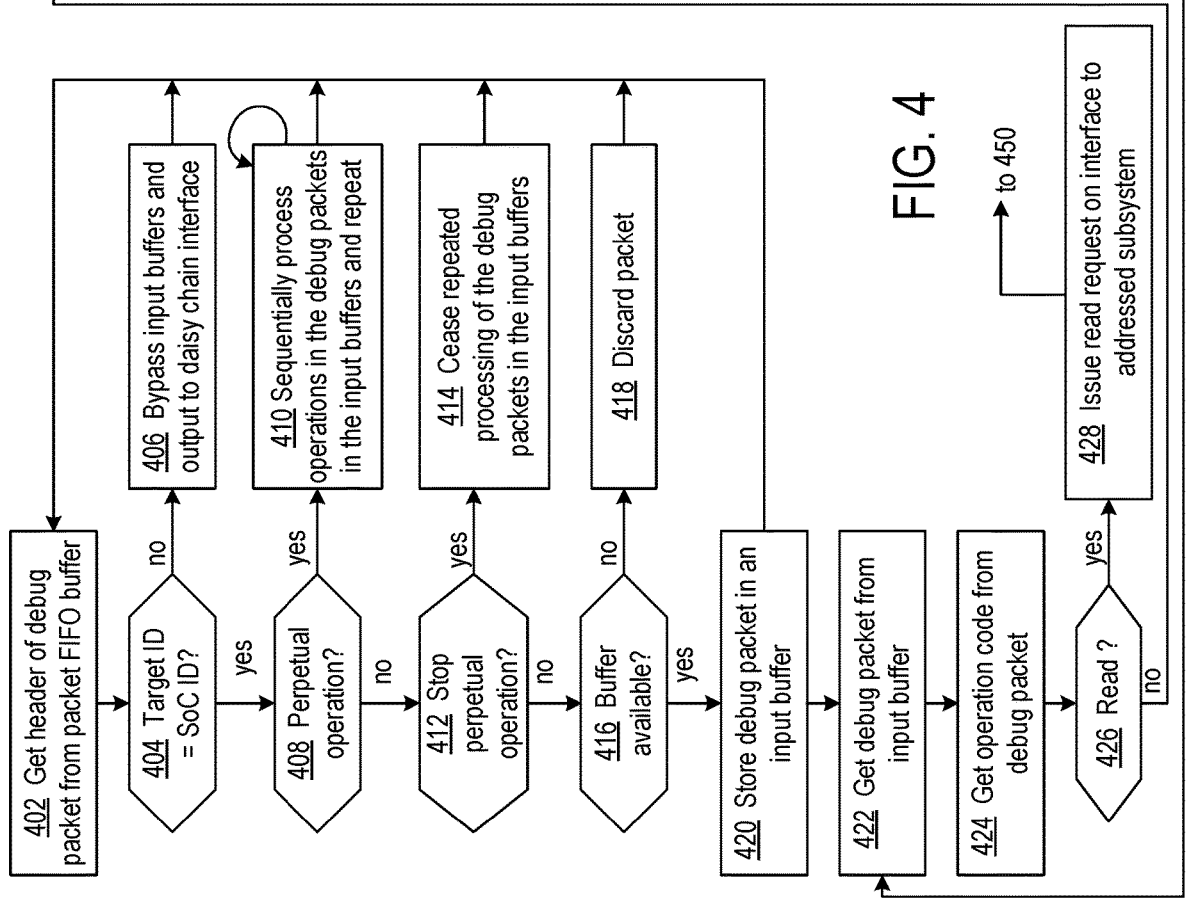

FIG. 4 is a flowchart that illustrates processing of debug packets by the debug packet controller. At block 402, the debug packet controller reads the header of the debug packet at the head of the packet FIFO buffer 310 (FIG. 3). If the Target_ID in the packet header is not equal to the device identifier of the SoC, decision block 404 directs the process to block 406, wherein the debug packet controller bypasses queuing of the debug packet in the input buffers 312, 314, . . . , 316 (FIG. 3) and outputs the packet to the next SoC in the daisy chain. The debug packet controller then returns to block 402 to read the header of the next packet in the packet FIFO buffer.

If the Target_ID in the packet header is equal to the identifier of the SoC, at decision block 408, the debug packet controller determines if the operation code in the header is Perpetual operation. In response to detecting the Perpetual operation code, at block 410 the debug packet controller sequentially processes the operation codes in the debug packets present in the input buffers 312, 314, . . . , 316. That is, the debug packet controller repeats for the debug packets in the input buffers, the decoding of the operation codes, determining interface circuits, and issuing requests until a Reset debug packet is detected in the packet FIFO buffer 310 by decision block 412. The processing of operation codes in a debug packet is shown as blocks 422-452. At block 414, the debug packet controller ceases the decoding of operation codes of the packets currently in the input buffers 312, 314, . . . , 316 in response to a Reset debug packet. If the next packet has a Perpetual operation code, the debug packet controller repeats the execution of commands in the packets in the input buffer. While the debug packet controller is in Perpetual operation mode, the debug packet controller continues to monitor the packet FIFO buffer for debug packets directed to other SoCs or a debug packet that stops the Perpetual operation mode.

At decision block 416, when the debug packet controller is not operating in Perpetual operation mode, the debug packet controller determines whether or not there is buffer storage available for the packet at the head of the packet input buffers 312, 314, . . . , 316. If no space is available in the input buffers, the packet is discarded at block 418, and control is returned to block 402. If storage is available in the input buffers, at block 420, the debug packet controller stores the debug packet in one of the input buffers and returns to block 402 to get the header of the next packet now at the head of the packet FIFO buffer. In parallel therewith, the debug packet controller continues at block 422. Note that the debug packet controller checks for available buffer space at block 416 and stores the packet in an input buffer at block 420 only for queued packets.

At block 422, the debug packet controller gets a debug packet from one of the input buffers 312, 314, . . . , 316 and at block 424 the debug packet controller gets an operation code from the debug packet. The operation code can be one of the subcommands described above.

If the debug packet controller detects a Read operation code, decision block 426 directs the process to block 428. At block 428, the debug packet controller issues a read request on the interface to the addressed subsystem of the SoC. The debug packet controller then continues at block 450 to check for more operations codes in the debug packet. If there are no further operation codes in the debug packet, the process returns to block 422 to get the next debug packet from the input buffers. In an exemplary implementation, the debug packet controller processes the debug packets in the input buffers 312, 314, . . . , 316 in a round-robin order. If there are more unprocessed operation codes in the debug packet, at block 452 the debug packet controller gets the next operation code from the packet and returns to decision block 426. The operation codes in a packet are processed in sequential order unless a Skip operation alters the flow.

If the debug packet controller detects a Write operation code, decision block 430 directs the process to block 432. At block 432, the debug packet controller issues a write request on the interface to the addressed subsystem of the SoC. The debug packet controller then continues at block 450 as described above.

If the debug packet controller detects a Test operation, decision block 434 directs the process to block 436. For a Test Memory operation code, at block 436, the debug packet controller issues a read request on the interface to the addressed subsystem of the SoC. At block 438, the debug packet controller performs a logic function (e.g., AND) of the data value by the read request with a mask value associated with the test operation in the debug packet. At block 440, the debug packet controller compares the result of the logic function to a compare value associated with the test operation. At block 442, the debug packet controller stores a value in the condition register 346 (FIG. 3) based on the comparison results. For example, if the comparison results indicate that the compare value is equal to the results of the logic function, a logic value 1 can be stored in the condition register. Otherwise, a logic value can be stored in the condition register. The debug packet controller then continues processing at decision block 450.

Another type of Test operation is a Test Condition. As described above, the TestCond_Mem_Op tests the value in the condition register 346 or a portion of the condition register. The processing of the Test Condition operation code by the debug packet controller is similar to the processing of the Test Memory operation code, except that a value is read from the condition register instead of reading a value from an address of one of the SoC subsystems.

At decision block 444, the debug packet controller checks for a Skip operation (e.g., SkipIf_Mem_Op). For a Skip operation, at block 445 the debug packet controller gets a value from the condition register 346. The Skip operation can be used to skip processing of memory operations in a debug packet to the location within the command payload of the debug packet. The location is represented by a destination field of the SkipIf_Mem_Op subcommand. If bits of the condition register specified in the subcommand are equal to the True field in the subcommand, at block 446 the debug packet controller skips to the specified location and gets the operation code at that location at block 448. If the compared values are not equal, the debug packet controller continues a block 450 to check for more operation codes.

Figure 5:
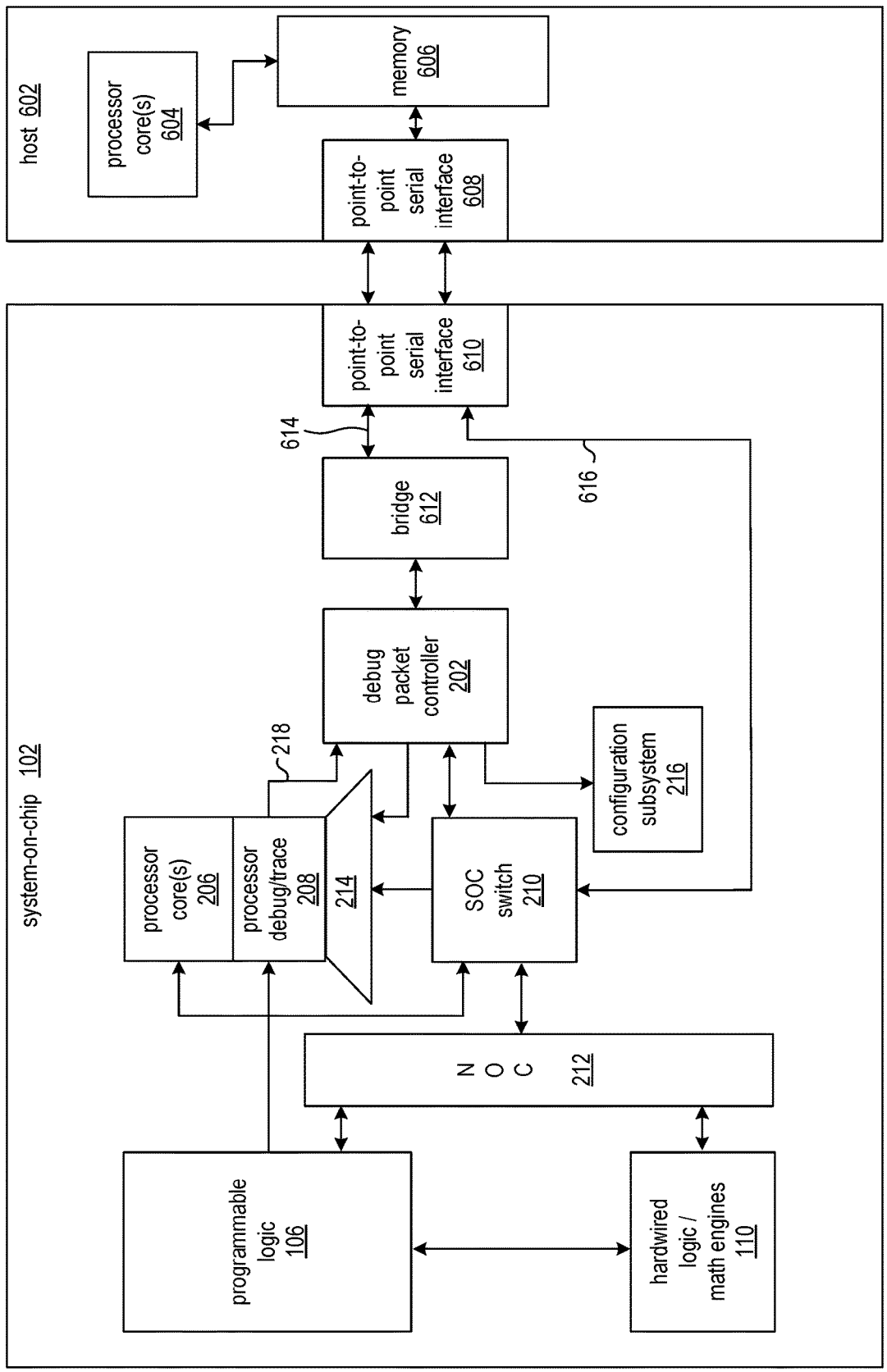
FIG. 5 shows an exemplary implementation of the SoC.

FIG. 5 shows an exemplary implementation of the SoC 102 of FIG. 2. The SoC is coupled to a host data processing system 602 ("host"). The host includes one or more processor cores 604, an arrangement of memory circuits (memory 606), and a point-to-point serial communications interface 608. The SoC 102 includes a point-to-point serial input-output circuit 610 and a bridge circuit 612 for coupling the debug packet controller to the point-to-point serial interface 610. Notably, the point-to-point serial interface is also coupled to the switch circuit 210, which together provide communication between the host 602 and the application circuitry implemented on the programmable logic 106, hardwired logic circuits 110, and/or processor core(s) 206.

The point-to-point serial interface 610 can be configured to operate in a memory map mode and includes high-speed (e.g., multiple Gigabit/sec) serial transceivers that provide the physical connection to the host 602. The bridge circuit 612 converts between memory mapped transactions of the point-to-point serial interface and stream transactions of the debug packet controller 202. The bridge circuit includes an ingress direct memory access (DMA) control circuit for inputting debug command packets and an egress DMA control circuit for outputting debug data from the SoC. Each of the ingress DMA path and the egress DMA path provides storage for multiple descriptors. In an exemplary implementation each path has storage for two descriptors.

In another implementation, the point-to-point serial interface 610 can be configured to operate in a streaming mode. In streaming mode, data streams are routed to the programmable logic 106. The bridge circuit 612 can be implemented in the programmable logic and communicate debug data through streaming interfaces of the debug packet controller 202.

The point-to-point serial input-output circuit 610 connects to multiple point-to-point serial communication paths on the SoC 102. In an exemplary implementation, the point-to-point serial input-output circuit implements a PCIe interface. A dedicated Physical Function (PF) of PCIe and can be programmed a priori for use as a debug channel. All configuration of bridge, debug commands, and debug data are communication through the specified PF. Application data is communicated through a PF other than the PF dedicated for debugging. Debug commands, debug data, and application data are all communicated to the host on the same set of physical signal lines. One serial communication path, as illustrated by line 614, is coupled to the bridge circuit 612. The bridge circuit reads debug command packets from the host memory 606 and provides the debug command packets to the debug packet controller 202. The bridge circuit also writes debug data gathered by the debug packet controller to the host memory 606 over the same path. Another serial communication path, as illustrated by line 616, is coupled to the switch circuit 210 and carries application data between application circuitry on the SoC and the host. The point-to-point input-output circuit is coupled one or more physical point-to-point connections to the host 602. The point-to-point input-output circuit communicates debug commands, debug data, and application data all over a single physical point-to-point connections to the host.

Figure 6:
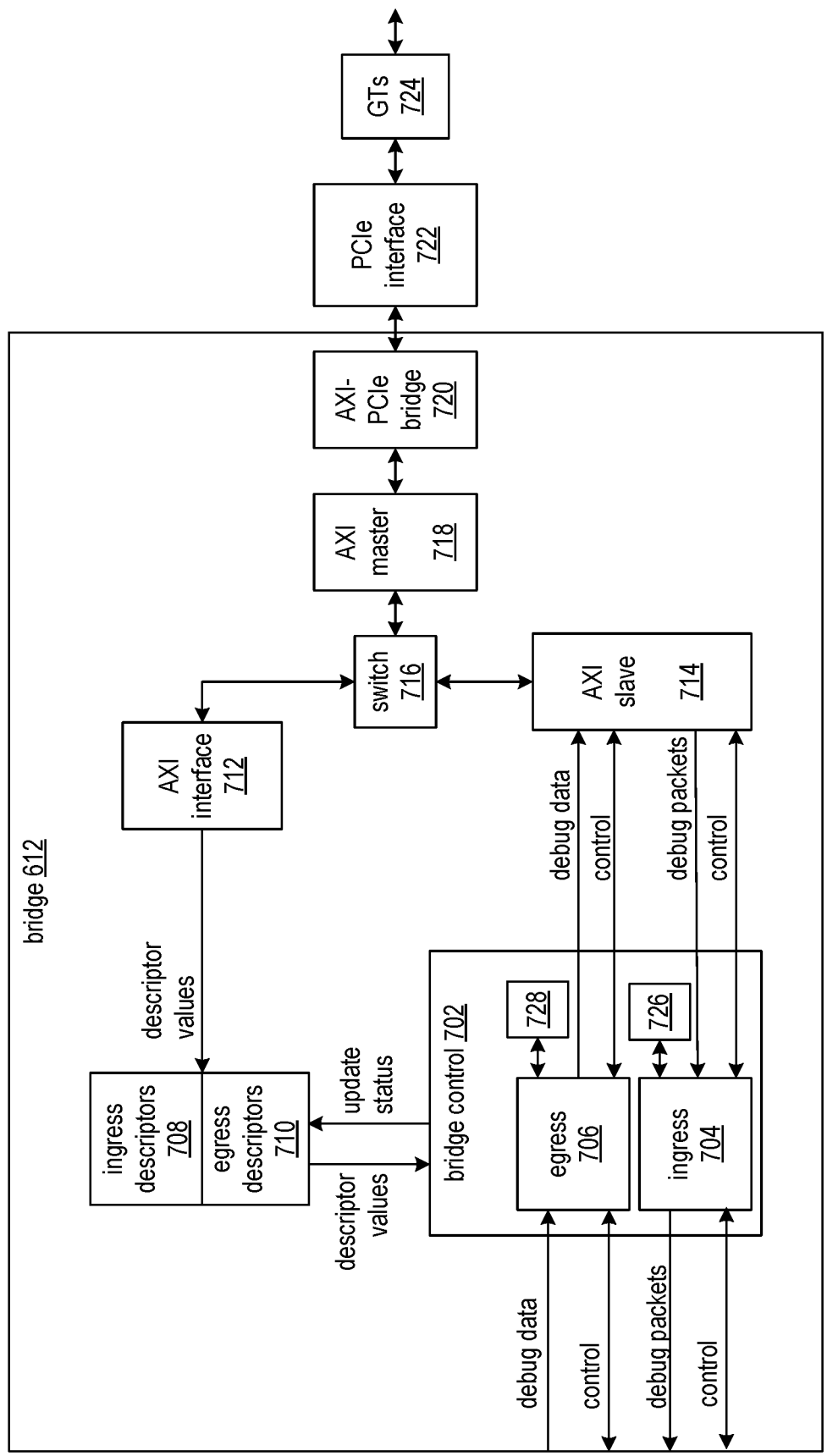
FIG. 6 shows an exemplary bridge circuit.

FIG. 6 shows an exemplary bridge circuit 612. The bridge circuit converts between DMA accesses to host memory and streaming packets to and from the debug packet controller 202 (FIG. 2). A bridge control circuit 702 includes an ingress control circuit 704 and an egress control circuit 706 that control the input of debug command packets and the output of debug data according to ingress descriptors and egress descriptors in storage circuit 708 and 710.

The bridge circuit 612 includes an AXI-PCIe bridge circuit 720 for translating between PCIe transactions communicated on the PCIe interface 722 and gigabit transceivers 724, and AXI transactions communicated through the AXI master circuit 718. Debug command packets are input by DMA over one path provided by the PCIe interface 722, and the bridge circuit converts the debug command packets to streaming data for output to the debug packet controller 202. The bridge circuit inputs the debug data captured by the debug packet controller as streaming data and outputs the debug data by DMA over another path provided by the PCIe interface 722.

The switch circuit 716 provides a connection between the AXI master circuit 718 and AXI interface circuit 712 and between the AXI master circuit 718 and AXI slave circuit 714. Switch 716 has a master port to AXI circuit 712 for writing the descriptors. The switch also has a master port to AXI master circuit 718 for reading debug commands from and writing debug data to host memory. The switch has a slave interface that is driven by AXI master circuit 718 and through which descriptor information is written directly by the host through PCIe. Slave ports of the switch are driven by ingress control circuit 704 and egress control circuit 706 through which debug commands are read and debug data are written, respectively. The AXI interface circuit 712 controls the writing of ingress descriptors and egress descriptors to the storage circuit 708 and 710.

The AXI slave circuit 714 can have two connections to switch 716. One connection can carry debug packets and control signals for the ingress control circuit 704, and the other connection can carry debug data and control signals for the egress control circuit 706.

In operation, the host 602 configures the bridge circuit 612 to commence a DMA transfer of a debug command packet and enable DMA transfer of debug data from the debug packet controller back to the host. The host writes a descriptor to the ingress descriptor storage circuit 708 to enable DMA transfer of a debug command packet and writes a descriptor to the egress descriptor storage circuit 710 to enable DMA transfer of debug data.

The ingress control circuit 704 inputs a descriptor from the ingress descriptor storage and issues a DMA transfer to obtain a debug command packet from host memory via the PCIe interface 722. The debug command packet read from host memory is written to the input buffer of the debug packet controller by the ingress control circuit. The egress control circuit 706 inputs a descriptor from the egress descriptor storage and transfers the debug data provided by the debug packet controller to the host memory through the PCIe physical function communicated to the PCIe interface by the egress circuit through the AXI slave circuit 714.

The bridge circuit 612 includes storage for multiple ingress descriptors and storage for multiple egress descriptors. The storage circuits are shown as blocks 708 and 710 and can be implemented as registers, for example. The ingress control circuit 704 processes ingress descriptors in the order in which the descriptors are written to the storage circuit 708, and the egress control circuit 706 processes egress descriptors in the order in which the descriptors are written to the storage circuit 710.

The host writes the values of a descriptor into the descriptor storage. The presence of a size value in a descriptor indicates to the ingress control circuit 704 that a DMA operation can be initiated. The size of the stream transfer into the debug packet controller matches the size value specified in the descriptor. If the size specified in the descriptor is greater than the available input buffer storage in the debug, the data is ignored by the debug packet controller. Similarly, if the host sends a debug command packet before the debug packet controller has buffer space available, the debug command packet is ignored.

Each ingress descriptor specifies an address of host memory and a quantity of data to read. Each ingress descriptor further includes storage for status flags indicating whether a DMA transfer is in-progress, an error has occurred, and the transfer is done. Each egress descriptor specifies an address of host memory at which debug data is to be written, a quantity of data, and a number of status flags. The status flags indicate that a transfer to host memory can commence ("GO"), whether a transfer is in progress, whether an error has occurred, and whether the transfer is complete.

A sideband interface from the debug packet controller to the egress descriptor storage 710 indicates the size of the debug data to be returned to the host. The egress control circuit 706 controls the flow of streaming data from the debug packet controller by asserting a READY signal. The debug packet controller asserts a VALID control signal only if the entire transaction containing the debug response data is stored and available for transfer by the bridge control egress circuit 706. The end of the debug data is indicated by the debug packet controller by asserting a last-transfer signal to the bridge control egress circuit. The bridge control egress circuit uses attributes on the AXI slave circuit 714 to target the specific physical function in PCIe interface 722.

The ingress path and the egress paths of the bridge circuit 612 can operate in parallel. That is, as the ingress control circuit 704 is reading debug command packets from host memory, the egress control circuit 706 is writing debug data to host memory.

In an exemplary implementation, the bridge control circuit 702 further includes FIFO buffer circuits 726 and 728. The FIFO buffer circuits are configured for storage of indices of ingress descriptors and egress descriptors in the storage circuits 708 and 710. Ingress control circuit 704 stores an index of an ingress descriptor found in storage circuit 708 in the FIFO buffer circuit 726 when the size value indicates the descriptor is ready for processing, and egress control circuit 706 stores an index of an egress descriptor found in storage circuit 710 in the FIFO buffer circuit 728 when the status flag indicates that a data transfer to host memory can commence. The ingress control circuit reads an index from the FIFO buffer circuit 726 and then reads the referenced ingress descriptor from the storage circuit 708 for processing. Similarly, the egress control circuit reads an index from the FIFO buffer circuit 728 and then reads the referenced egress descriptor from the storage circuit 710 for processing.

Figure 7:
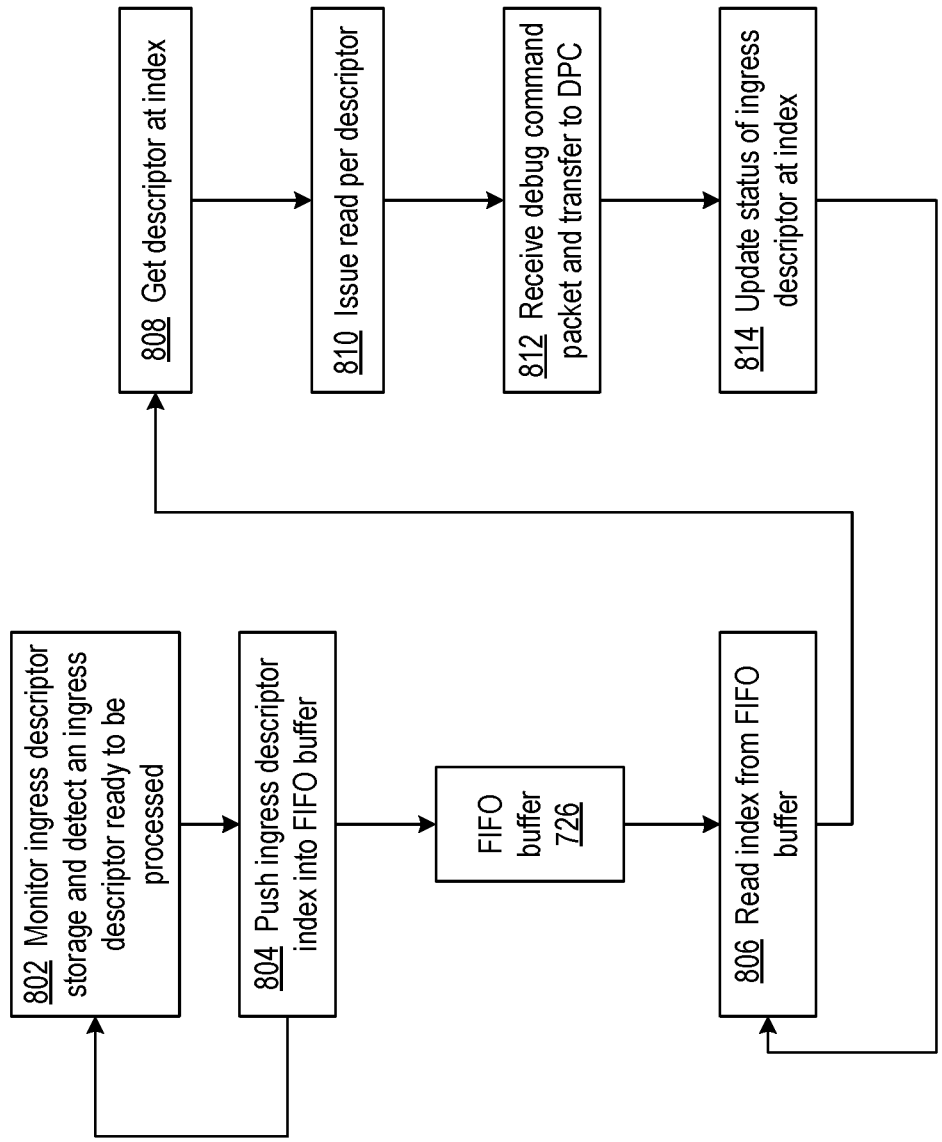
FIG. 7 shows a flowchart of an exemplary process performed by the ingress control circuit.

FIG. 7 shows a flowchart of an exemplary process performed by the ingress control circuit 704. At block 802, the ingress control circuit monitors the storage circuit 708 and detects an ingress descriptor that is ready to be processed. In an exemplary implementation, the presence of a size value written by the host in an ingress descriptor indicates to the ingress control circuit that a DMA operation can be initiated.

In response to detecting that an ingress descriptor is ready for processing, at block 804, the ingress control circuit 704 pushes the index of the ingress descriptor into the FIFO buffer circuit 726 and returns to block 802 to monitor the ingress descriptor storage. At block 806, the ingress control circuit reads an index from the FIFO buffer circuit and reads the ingress descriptor from the storage circuit 708 at block 808.

At block 810, the ingress control circuit 704 issues a DMA read to host memory as specified by the ingress descriptor, and at block 812 receives a debug command packet and transfers the packet to the debug packet controller 202. The ingress control circuit updates the status of the ingress descriptor at block 814 to indicate that processing is complete and that the storage occupied by the completed ingress descriptor is available for another ingress descriptor. The ingress control circuit then returns to block 806 to process another ingress descriptor.

Figure 8:
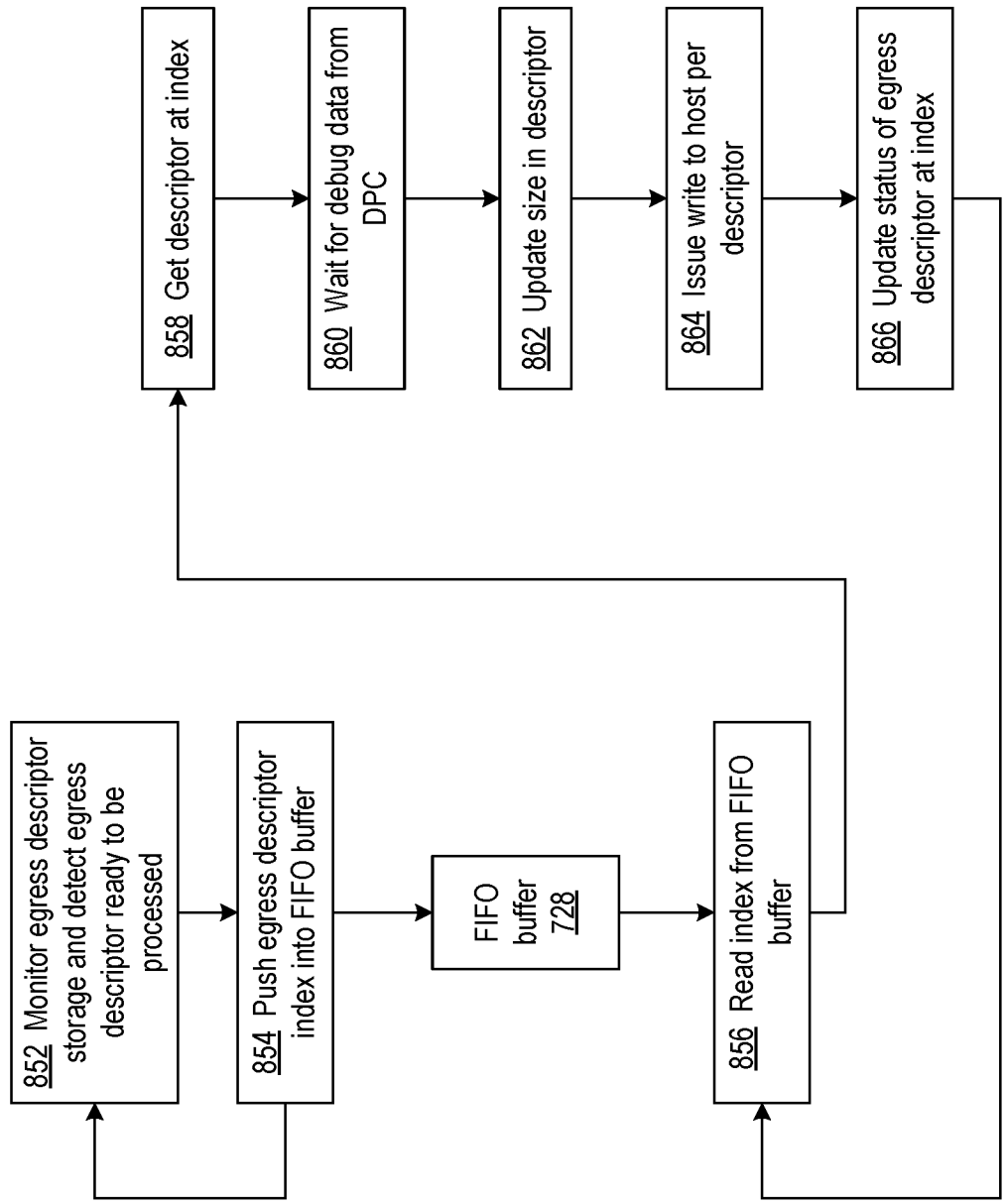
FIG. 8 shows a flowchart of an exemplary process performed by the egress control circuit.

FIG. 8 shows a flowchart of an exemplary process performed by the egress control circuit 706. At block 852, the egress control circuit monitors the storage circuit 708 and detects an ingress descriptor that is ready to be processed. In an exemplary implementation, the host stores a value in a GO flag in the egress descriptor to indicate that the egress descriptor is ready to be processed.

In response to detecting that an egress descriptor is ready for processing, at block 854, the egress control circuit 706 pushes the index of the egress descriptor into the FIFO buffer circuit 728 and returns to block 852 to monitor the egress descriptor storage. At block 856, the egress control circuit reads an index from the FIFO buffer circuit and reads the egress descriptor from the storage circuit 710 at block 858.

At block 860, the egress control circuit waits for debug data to be available in the output buffer of the debug packet control circuit 202. In response to available debug data from the debug packet control circuit, the egress control circuit updates the size field in the egress descriptor at block 862 and issues a DMA write to host memory at block 864 per the egress descriptor. The egress control circuit updates the status of the egress descriptor at block 866 to indicate that processing is complete and that the storage occupied by the completed egress descriptor is available for another egress descriptor. The egress control circuit then returns to block 856 to process another egress descriptor.

Figure 9:
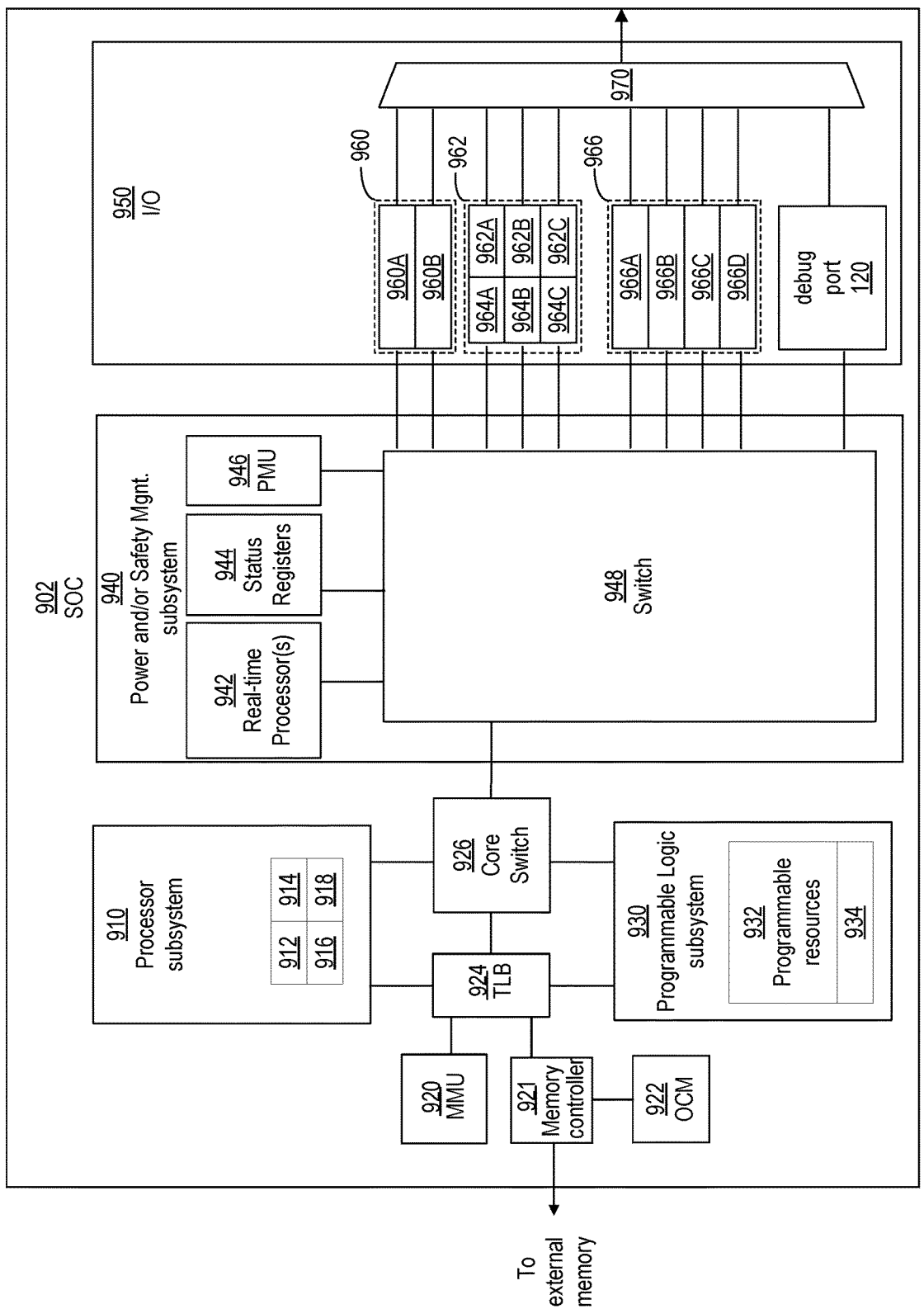
FIG. 9 shows an exemplary programmable IC that can be configured in accordance with the disclosed circuitry.

FIG. 9 shows an exemplary programmable IC 902 that can be configured in accordance with the disclosed circuitry. The programmable IC may also be referred to as an SoC, which includes a processor subsystem 910 and a programmable logic subsystem 930. The processor subsystem 910 may be programmed to implement a software portion of the user design, via execution of a user program. The program may be specified as part of a configuration data stream or may be retrieved from an on-chip or off-chip data storage device. The processor subsystem 910 may include various circuits 912, 914, 916, and 918 for executing one or more software programs. The circuits 912, 914, 916, and 918 may include, for example, one or more processor cores, floating point units (FPUs), an interrupt processing unit, on chipmemory, memory caches, and/or cache coherent interconnect.

The programmable logic subsystem 930 of the programmable IC 902 may be programmed to implement a hardware portion of a user design. For instance, the programmable logic subsystem may include a number of programmable resources 932, which may be programmed to implement a set of circuits specified in a configuration data stream. The programmable resources 932 include, for example, programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 932 may be programmed by loading a configuration data stream into the configuration memory cells, which define how the programmable interconnect circuits and programmable logic circuits are configured. For example, setting a configuration memory cell for a configurable latch to a first value may direct the configurable latch to operate as a single-edge-driven latch. Setting the configuration memory cell to a second value may direct the configurable latch to operate as a double-edgedriven latch. The collective states of the individual memory cells then determine the function of the programmable resources 932. The configuration data can be read from memory (e.g., from an external flash memory) or written into the programmable IC 902 by an external device. In some implementations, a configuration controller 934 included in the programmable logic subsystem 930 may program the programmable resources, in response to powering on the programmable IC, by retrieving configuration data from a non-volatile memory coupled to the programmable IC and loading the configuration data into the configuration memory cells. In some other implementations, the configuration data may be loaded into the configuration memory cells by a start-up process executed by the processor subsystem 910.

The programmable IC 902 may include various circuits to interconnect the processor subsystem 910 with circuitry implemented within the programmable logic subsystem 930. In this example, the programmable IC 902 includes a core switch 926 that can route data signals between various data ports of the processor subsystem 910 and the programmable logic subsystem 930. The core switch 926 may also route data signals between either of the programmable logic or processing subsystems 910 and 930 and various other circuits of the programmable IC, such as an internal data bus. Alternatively or additionally, the processor subsystem 910 may include an interface to directly connect with the programmable logic subsystem—bypassing the core switch 926. Such an interface may be implemented, for example, using the AMBA AXI Protocol Specification (AXI) as published by ARM.

In some implementations, the processor subsystem 910 and the programmable logic subsystem 930 may also read or write to memory locations of an on-chip memory 922 or off-chip memory (not shown) via memory controller 921. The memory controller 921 can be implemented to communicate with one or more different types of memory circuits including, but not limited to, Double Data Rate (DDR) 2, DDR3, Low Power (LP) DDR2 types of memory, whether 16-bit, 32-bit, 16-bit with ECC, etc. The list of different memory types with which memory controller 921 is able to communicate is provided for purposes of illustration only and is not intended as a limitation or to be exhaustive. As shown in FIG. 9, the programmable IC 902 may include a memory management unit 920 and translation look-aside buffer 924 to translate virtual memory addresses used by the subsystems 910 and 930 to physical memory addresses used by the memory controller 921 to access specific memory locations.

The programmable IC may include an input/output (I/O) subsystem 950 for communication of data with external circuits. The I/O subsystem 950 may include various types of I/O devices or interfaces including for example, flash memory type I/O devices, higher performance I/O devices, lower performance interfaces, debugging I/O devices, and/or RAM I/O devices.

The I/O subsystem 950 may include one or more flash memory interfaces 960 illustrated as 960A and 960B. For example, one or more of flash memory interfaces 960 can be implemented as a Quad-Serial Peripheral Interface (QSPI) configured for 4-bit communication. One or more of flash memory interfaces 960 can be implemented as a parallel 8-bit NOR/SRAM type of interface. One or more of flash memory interfaces 960 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 950 can include one or more interfaces 962 providing a higher level of performance than flash memory interfaces 960. Each of interfaces 962A-962C can be coupled to a DMA controller 964A-964C respectively. For example, one or more of interfaces 962 can be implemented as a Universal Serial Bus (USB) type of interface. One or more of interfaces 962 can be implemented as a gigabit Ethernet type of interface. One or more of interfaces 962 can be implemented as a Secure Digital (SD) type of interface.

The I/O subsystem 950 may also include one or more interfaces 966 such as interfaces 966A-966D that provide a lower level of performance than interfaces 962. For example, one or more of interfaces 966 can be implemented as a General Purpose I/O (GPIO) type of interface. One or more of interfaces 966 can be implemented as a Universal Asynchronous Receiver/Transmitter (UART) type of interface. One or more of interfaces 966 can be implemented in the form of a Serial Peripheral Interface (SPI) bus type of interface. One or more of interfaces 966 can be implemented in the form of a Controller-Area-Network (CAN) type of interface and/or an inter-integrated circuit (I²C) type of interface. One or more of interfaces 966 also can be implemented in the form of a timer type of interface. The I/O subsystem 950 can include the debug port 120 as described above.

As shown, each of interfaces 960, 962, 966, and debug port 120 can be coupled to a multiplexer 970. Multiplexer 970 provides a plurality of outputs that can be directly routed or coupled to external pins of the programmable IC 902, e.g., balls of the package within which the programmable IC 902 is disposed. For example, I/O pins of programmable IC 902 can be shared among interfaces 960, 962, 966, and debug port 120. A user can configure multiplexer 970, via a configuration data stream to select which of interfaces 960-966 and debug port 120 are to be used and, therefore, coupled to I/O pins of programmable IC 902 via multiplexer 970. The I/O subsystem 950, may also include a fabric multiplexer I/O (FMIO) interface (not shown) to connect interfaces 960-966 to programmable logic circuits of the programmable logic subsystem. Additionally or alternatively, the programmable logic subsystem 930 can be configured to implement one or more I/O circuits within programmable logic. In some implementations, the programmable IC 902 may also include a subsystem 940 having various circuits for power and/or safety management. For example, the subsystem 940 may include a power management unit 946 configured to monitor and maintain one or more voltage domains used to power the various subsystems of the programmable IC 902. In some implementations, the power management unit 946 may disable power of individual subsystems, when idle, to reduce power consumption, without disabling power to subsystems in use. The debug interface for the power/platform manger can be accessed directly by Debug Packet Controller through Memory operation codes. This allows a user to debug the firmware/code that runs on the platform management controller.

The subsystem 940 may also include safety circuits to monitor the status of the subsystems to ensure correct operation. For instance, the subsystem 940 may include one or more real-time processors 942 configured to monitor the status of the various subsystems (e.g., as indicated in status registers 944). The real-time processors 942 may be configured to perform a number of tasks in response to detecting errors. For example, for some errors, the real-time processors 942 may generate an alert in response to detecting an error. As another example, the real-time processors 942 may reset a subsystem to attempt to restore the subsystem to correct operation. The subsystem 940 includes a switch network 948 that may be used to interconnect various subsystems. For example, the switch network 948 may be configured to connect the various subsystems 910, 930, and 940 to various interfaces of the I/O subsystem 950. In some applications, the switch network 948 may also be used to isolate the real-time processors 942 from the subsystems that are to be monitored. Such isolation may be required by certain application standards (e.g., IEC-61508 SIL3 or ISO-26262 standards) to ensure that the real-time processors 942 are not affected by errors that occur in other subsystems.

Though aspects and features may in some cases be described in individual figures, it will be appreciated that features from one figure can be combined with features of another figure even though the combination is not explicitly shown or explicitly described as a combination.

The disclosed circuits and methods are thought to be applicable to a variety of systems for debugging SoCs. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
    an input-output circuit coupled to a plurality of serial communication paths and to a physical point-to-point interface, the input-output circuit configured to transmit data received on the plurality of serial communication paths over the physical point-to-point interface;
    an application circuit coupled to the input-output circuit and configured to communicate application data via a first one of the paths in performing application functions;
    a bridge circuit coupled to the input-output circuit and configured to communicate via a second one of the paths; and
    a debug circuit coupled to the application circuit and to the bridge circuit, the debug circuit configured to capture debug data of the application circuit and provide the debug data to the bridge circuit for communication via the second one of the paths in parallel with communication of the application data over the first one of the paths.

2. The circuit arrangement of claim 1, wherein the bridge circuit is further configured to:
    input debug packets over the second one of the paths and output the debug packets to the debug circuit; and
    input the debug data captured by the debug circuit and output the debug data over the second one of the paths.

3. The circuit arrangement of claim 1, wherein the bridge circuit is further configured to:
    input debug packets by direct memory access (DMA) over the second one of the paths and output the debug packets as streaming data to the debug circuit; and
    input the debug data captured from the application circuit as streaming data and output the debug data by DMA over the first one of the paths.

4. The circuit arrangement of claim 3, wherein the bridge circuit includes:
    an ingress control circuit configured to input the debug packets by DMA; and
    an egress control circuit configured to input the debug data captured from the application circuit; in parallel with the ingress control circuit inputting the debug packets.

5. The circuit arrangement of claim 4, further comprising:
    a first storage circuit coupled to the ingress control circuit and configured for storage of a plurality of ingress descriptors; and
    a second storage circuit coupled to the egress control circuit and configured for storage of a plurality of egress descriptors.

6. The circuit arrangement of claim 5, further comprising:
a first first-in-first-out (FIFO) buffer circuit coupled to the ingress DMA controller;
wherein the ingress control circuit is configured to:
store into the first FIFO buffer circuit, indices of ingress descriptors stored in the first storage circuit,
read from the first FIFO buffer circuit, indices of ingress descriptors stored in the first storage circuit, and
read ingress descriptors from the first storage circuit at indices read from the first FIFO buffer circuit;
a second FIFO buffer circuit coupled to the egress control circuit; and
wherein the egress control circuit is configured to:
store into the second FIFO buffer circuit, indices of egress descriptors stored in the second storage circuit,
read from the second FIFO buffer circuit, indices of egress descriptors stored in the second storage circuit, and
read egress descriptors from the second storage circuit at indices read from the second FIFO buffer circuit.

7. A system-on-chip (SOC), comprising:
an integrated circuit (IC) die;
a plurality of circuit subsystems disposed on the IC die;
a plurality of interface circuits configured to access storage circuits in the plurality of circuit subsystems;
an input-output circuit coupled to a plurality of serial communication paths and to a physical point-to-point interface, the input-output circuit configured to transmit data received on the plurality of serial communication paths over the physical point-to-point interface;
application circuitry implemented on the plurality of subsystems and coupled to the input-output circuit and configured to communicate application data via a first one of the paths in performing application functions;
a bridge circuit coupled to the input-output circuit and configured to communicate via a second one of the paths; and
a debug circuit coupled to the application circuit, the bridge circuit, and to the plurality of interface circuits, the debug circuit configured to capture debug data of the application circuitry and provide the debug data to the bridge circuit for communication via the second one of the paths in parallel with communication of the application data over the first one of the paths.

8. The SOC of claim 7, wherein the bridge circuit is further configured to:
input debug packets over the second one of the paths and output the debug packets to the debug circuit; and
input the debug data captured by the debug circuit and output the debug data over the second one of the paths.

9. The SOC of claim 7, wherein the bridge circuit is further configured to:
input debug packets by direct memory access (DMA) over the second one of the communication paths and output the debug packets as streaming data to the debug circuit; and
input the debug data captured from the application circuit as streaming data and output the debug data by DMA over the first one of the communication paths.

10. The SOC of claim 9, wherein the bridge circuit includes:
an ingress control circuit configured to input the debug packets by DMA; and
an egress control circuit configured to input the debug data captured from the application circuit; in parallel with the ingress control circuit inputting the debug packets.

11. The SOC of claim 10, further comprising:
a first storage circuit coupled to the ingress control circuit and configured for storage of a plurality of ingress descriptors; and
a second storage circuit coupled to the egress control circuit and configured for storage of a plurality of egress descriptors.

12. The SOC of claim 11, further comprising:
a first first-in-first-out (FIFO) buffer circuit coupled to the ingress DMA controller;
wherein the ingress control circuit is configured to:
store into the first FIFO buffer circuit, indices of ingress descriptors stored in the first storage circuit,
read from the first FIFO buffer circuit, indices of ingress descriptors stored in the first storage circuit, and
read ingress descriptors from the first storage circuit at indices read from the first FIFO buffer circuit;
a second FIFO buffer circuit coupled to the egress control circuit; and
wherein the egress control circuit is configured to:
store into the second FIFO buffer circuit, indices of egress descriptors stored in the second storage circuit,
read from the second FIFO buffer circuit, indices of egress descriptors stored in the second storage circuit, and
read egress descriptors from the second storage circuit at indices read from the second FIFO buffer circuit.

13. The SOC of claim 7, wherein one subsystem of the plurality of circuit subsystems includes one or more processor cores.

14. The SOC of claim 13, wherein another subsystem of the plurality of circuit subsystems includes programmable logic.

15. The SOC of claim 7, wherein the bridge circuit is configured to operate in one of a memory map mode or a streaming mode.

16. A method comprising:
performing application functions of application circuitry on an integrated circuit (IC);
inputting application data to and outputting application data from the application circuitry via a first path of a plurality of serial communication paths coupled to an input-output circuit of the integrated circuit;
capturing debug data of the application circuitry by a debug circuit implemented on the IC;
transmitting the debug data from the debug circuit to a bridge circuit;
outputting the debug data from the bridge circuit via a second one of the communication paths to the input-output circuit in parallel with communication of the application data over the first path; and
outputting the debug data and application data by the input-output circuit via a single physical point-to-point interface.

17. The method of claim 16, further comprising:
inputting debug packets by the bridge circuit over the second one of the communication paths and outputting the debug packets to the debug circuit; and
inputting the debug data captured by the debug circuit to the bridge circuit and outputting the debug data over the second one of the communication paths.

18. The method of claim 16, further comprising:

inputting debug packets to the bridge circuit by direct memory access (DMA) over the second one of the communication paths and outputting the debug packets as streaming data to the debug circuit; and inputting the debug data captured from the application circuit to the bridge circuit as streaming data and output the debug data by DMA over the first one of the communication paths.

19. The method of claim 18, wherein:

the inputting the debug packets includes inputting the debug packets by an ingress control circuit by DMA; and the inputting the debug data includes inputting the debug data by an egress control circuit in parallel with the inputting the debug packets by the ingress control circuit.

20. The method of claim 19, further comprising:

storing a plurality of ingress descriptors in a first storage circuit by the ingress control circuit; and storing a plurality of egress descriptors in a second storage circuit by the egress control circuit.

\* \* \* \* \*